Jan. 20, 1970 A. SHOH 3,491,250

OSCILLATORY LOAD CIRCUIT

Filed Dec. 12, 1967 2 Sheets-Sheet 1

Andrew Shoh
INVENTOR.

BY:

Ervin B. Steinberg

Andrew Shoh
INVENTOR.

BY:

Erwin B. Steinberg

United States Patent Office 3,491,250
Patented Jan. 20, 1970

3,491,250
OSCILLATORY LOAD CIRCUIT

Andrew Shoh, Ridgefield, Conn., assignor to Branson Instruments, Incorporated, Stamford, Conn., a corporation of Delaware Filed Dec. 12, 1967, Ser. No. 689,906
Int. Cl. H02j 1/00
U.S. Cl. 307—154 5 Claims

ABSTRACT OF THE DISCLOSURE

An oscillatory circuit receives power from a source of direct current through semiconductor switching means. In order to avoid the paralleling of semiconductors, i.e. transistors, which may lead to unequal current sharing, the switching means are arranged as separate modules, each module being transformer coupled to the oscillatory circuit. The transformer means are used to provide equal current sharing among the switching means and to provide to the oscillatory circuit power which is the sum of the power through the individual switching modules.

This invention refers to an oscillatory circuit and means for driving the same. More specifically, this invention refers to an ultrasonic power circuit and means for obtaining an increased power output using semiconductors, particularly transistors. Quite specifically, the invention concerns an arrangement for obtaining equal load distribution among semiconductors used in the driver stage of an ultrasonic power circuit, with provisions for increasing the power output available from the circuit without overloading the individual semiconductor devices, particularly transistors.

Recent advances in the use of ultrasonic energy, such as ultrasonic welding of metal or plastic parts, have led to the use of ultrasonic units of steadily increasing power rating. While transistors are available to switch relatively large amounts of power, there are practical limits with regard to the switching power which can be handled by a single semiconductor. It is well known that semiconductors are damaged by even a short-duration current peak which exeeds the stated power rating. When the power is to be increased, standard circuits provide for the parallel connection of transistors. This arrangement, in many instances, is unsatisfactory since, due to the inherent difference in parameters, it is difficult to obtain equal load sharing among semiconductors. The matching of semiconductors possessing substantially equal characteristics is a time consuming and expensive task and, in the event that a single transistor becomes inoperative, conceivably an entirely new set of transistors may have to be substituted. This latter alternative, therefore, increases the cost and the complexity of a field repair job without definite assure that an equal load distribution actually prevails. Another and often used method involves the use of resistors connected in series with the transistors. This arrangement increases the power losses of the circuit and, therefore, is not satisfactory.

The present invention is directed to a power switching circuit wherein the high power output delivered from an ultrasonic energy source requires the use of a plurality of semiconductors. The particular circuit described hereafter allows for an expansion of the basic balanced circuit to handle increasingly larger amounts of power without inducing unequal load sharing among the semiconductors used for switching purposes.

One of the important objects of this invention is, therefore, the provision of a new and improved oscillatory circuit for driving an ultrasonic energy source.

Another important object of this invention is the provision of a novel switching arrangement for an oscillatory circuit, the switching circuit being adapted to switch large amounts of power.

Still another object of this invention is the provision of a switching circuit for an oscillatory circuit, using semiconductors and including means for providing equal load distribution among a plurality of semiconductors used.

A further object of this invention comprises the provision of a high power switching circuit for an oscillatory load circuit, avoiding the parallel connection of transistors and eliminating the need for selecting matched transistors.

A still further object of this invention is the provision of a switching circuit for an oscillatory circuit arranged in modular fashion and including means for expanding the quantity of circuit modules used, thus providing for increasing amounts of power.

Further and still other objects of this invention will be more clearly apparent by reference to the following description, when taken in conjunction with the accompanying drawings in which.

Figure 1:
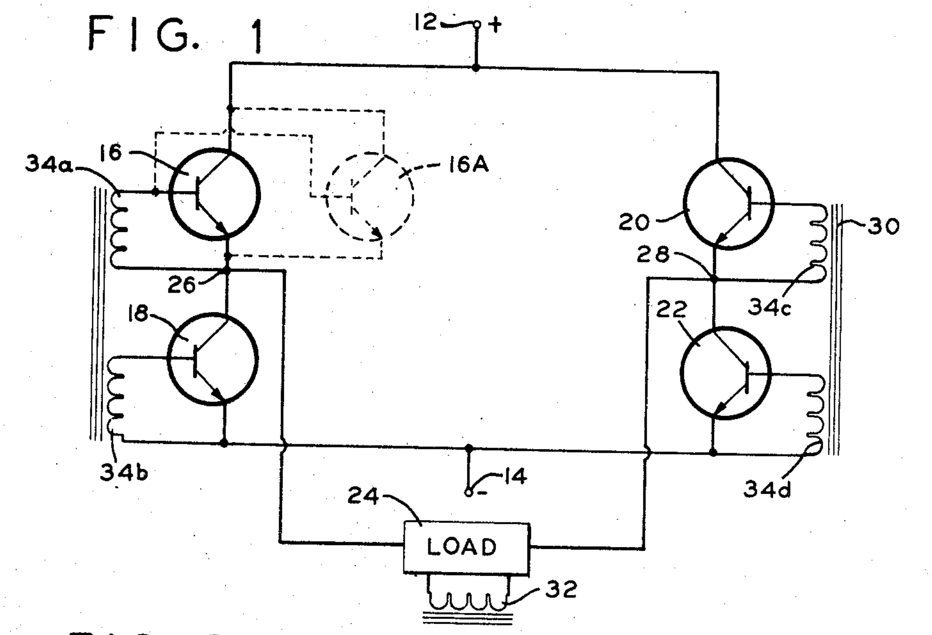
FIGURE 1 is a schematic electrical circuit diagram of the prior art.

Referring now to the figures and FIGURE 1 in particular, numerals 12 and 14 identify respectively the positive and the negative terminal of a supply of direct current (not shown). Between the terminals 12 and 14 there is coupled a first pair of series connected switching transistors 16 and 18 and a second pair of series connected transistors 20 and 22. An oscillatory load circuit 24, shown in block form, is connected to the terminals 26 and 28 which are the junction points between the respective series connected transistors. In order to establish and control the current conduction through the respective transistors, there is provided a feedback transformer 30 having a primary winding 32, coupled to the load circuit 24, and four secondary windings 34*a*, 34*b*, 34*c*, and 34*d*, one for controlling the current conduction through each of the transistors.

The circuit is operated in such a way that during a first half cycle current flows from the positive terminal 12 through the transistor 16 to the terminal 26, and from there through the load 24, to the terminal 28, through the transistor 22 and to the negative terminal 14. During the succeeding half cycle the current flows from the positive terminal 12 through the transistor 20, terminal 28, load 24, terminal 26, transistor 18 and to the negative terminal 14. Thus, it will be seen that the current flow through the load 24 is of alternating polarity and the winding 32, forming a part of the transformer 30, impresses a suitable bias on the respective transistor terminals to control the operation of the transistors in the manner described hereinabove whereby to sustain the operation of the oscillatory circuit. The switching circuit depicted is known also as a bridge connection, see for instance "Motorola Power Transistor Handbook" (1960), first edition, page 147, published by Motorola Semiconductor Products Division, Inc., Phoenix, Ariz.

Assuming now that each of the transistors is operating at or near its rated capacity, and that the power of the load circuit 24 is to be increased, it will be apparent that quite conventionally additional transistors are connected in parallel. In other words, each of the transistors 16, 18, 20 and 22 is provided with additional transistors connected in parallel, such as is indicated by the transistor 16A connected in parallel by dashed lines with the transistor 16. As is known to those skilled in the art, such a connection is highly undesirable in view of the fact that there is no assurance that equal load sharing occurs, and even if transistors are used which are matched with respect to certain characteristics, there remain small inherent differences which cause a mismatch. The use of resistors connected in series with the emitter electrode of the transistors to obtain a more nearly equal load distribution increases the power losses of the circuit and provides merely an approximation for achieving equal sharing of current conduction.

Figure 2:
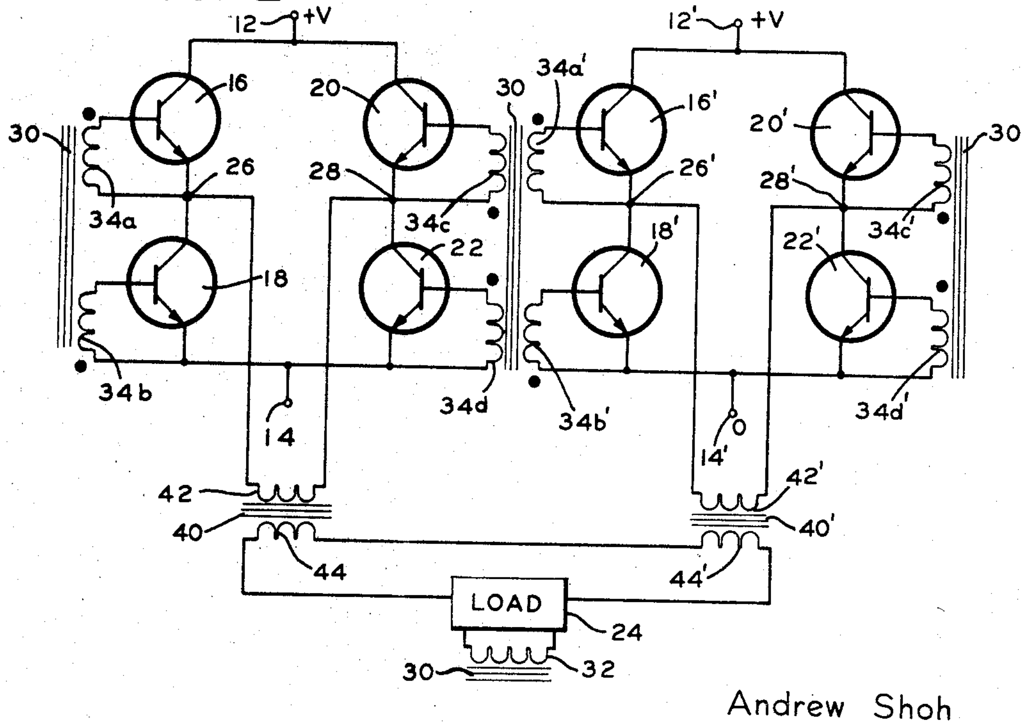
FIGURE 2 is a schematic electrical circuit diagram depicting the improved arrangement.

FIGURE 2 shows the improved arrangement comprehended by this invention. The basic bridge connection switching circuit is employed twice. The first switching circuit, or module, comprises the transistors 16, 18, 20 and 22; and the second switching circuit comprises the transistors 16', 18', 20' and 22'. Each of the switching circuits is coupled to the load 24 by means of an associated driving transformers 40 and 40'. The primary winding 42 of the transformer 40 is coupled to the terminals 26 and 28 of the first switching module; and the corresponding winding 42' of the transformer 40' is coupled to the junction points 26' and 28' of the second module. The respective secondary windings 44 and 44' are coupled in series with each other and to the load circuit 24. The feedback transformer 30 is provided with a primary winding 32, coupled to the load, and eight secondary windings **34*a*, 34*b*, 34*c*, 34*d*, 34*a'*, 34*b'*, 34*c'* and 34*d'*** to control the operation of the respective transistors.

It will be apparent that the switching circuit shown comprises independent switching modules and that the second module can be used to double the power provided by the first module. If additional power is required, exceeding that provided by the two modules shown in FIGURE 2, additional identical switching modules can readily be added, thus expanding the circuit to provide for the additional power available from the load circuit 24.

In the embodiment shown, the turns ratio of the windings 42 to 44 is the same as that of windings 42' to 44', and the number of turns of the windings 42 and 42' is identical also. Since the windings 44 and 44' are connected in series, the current through the winding 42 is identical with that flowing through the winding 42' and hence, the current flow from the source of direct current in each of the switching modules is the same. Therefore, each switching module can be operated at or near its maximum rating without danger of unequal load distribution among the transistors. The power to the load 24 is the sum of the power provided by the two switching modules.

Figure 3:
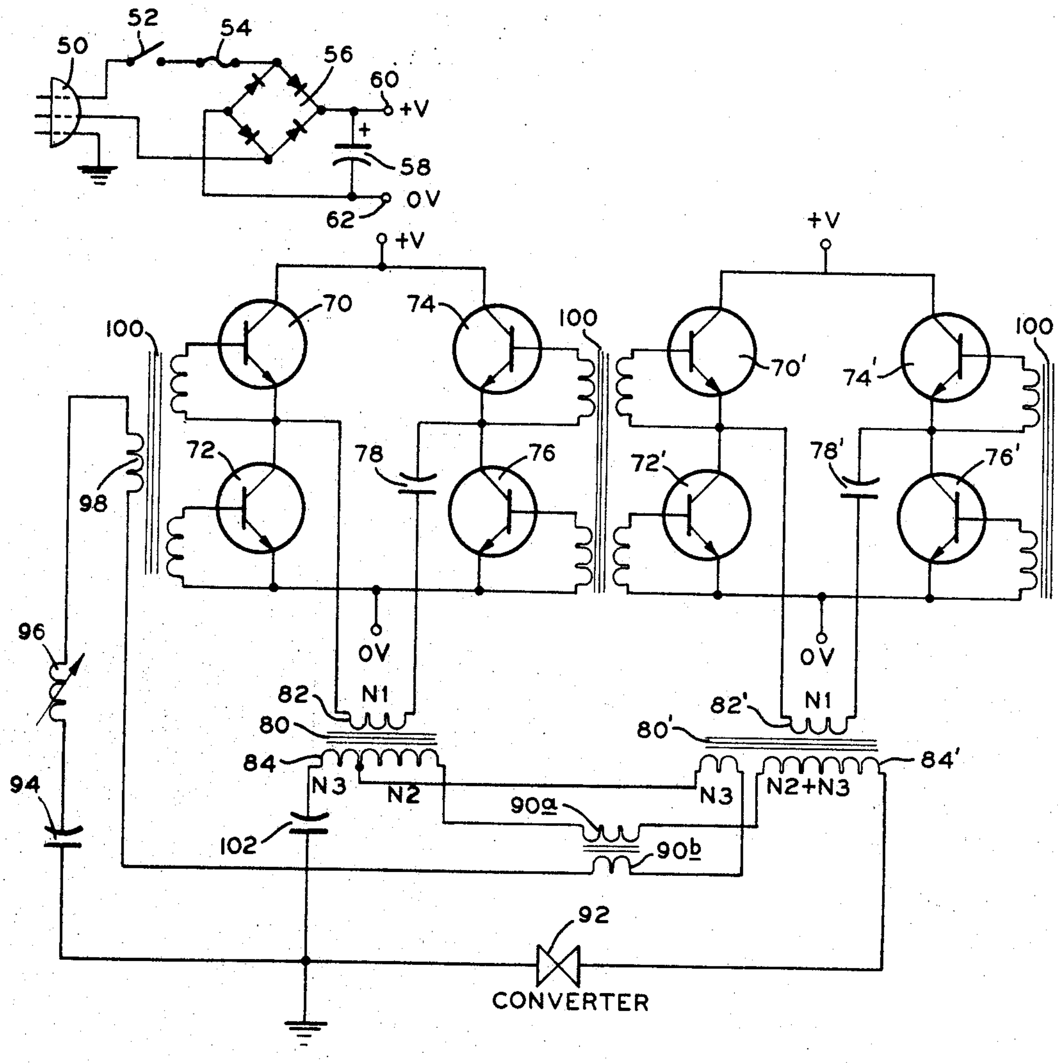
FIGURE 3 is a schematic electrical circuit diagram of substantially the complete ultrasonic power circuit.

FIGURE 3 shows a substantially complete ultrasonic oscillator circuit as used, for instance, for welding thermoplastic materials. The circuit typically operates at an ultrasonic frequency of approximately 20 kHz.

Direct current is supplied from a conventional A-C inlet plug 50 via a switch 52, fuse 54, a bridge type rectifier 56, and a filter capacitor 58 to the positive terminal 60 and a negative terminal 62.

The circuit includes additionally two switching modules of the type described hereinbefore. The first module comprises four transistors 70, 72, 74 and 76, while the second module comprises the transistors 70', 72', 74' and 76'. The capacitors 78 and 78' are used for direct current blocking purposes and are coupled in series with the respective primary windings 82 and 82' of the power transformers 80 and 80'.

The secondary windings 84 and 84' of the transformers 80 and 80' are connected in series with one another and connected also in series with an inductance **90*a* and an ultrasonic converter 92. The ultrasonic converter includes a piezoelectric element for converting electrical energy applied thereto to acoustic energy. In the preferred embodiment the converter is of the construction shown in U.S. Patent No. 3,328,610, issued to S. E. Jacke et al. on June 27, 1967, entitled "Sonic Wave Generator." The frequency of resonance is determined primarily by the mechanical constants of the converter 92. The feedback circuit for controlling the operation of the transistors of the switching modules comprises the series connection of the windings having the turns N3 of the transformers 80 and 80', the feedback phase correction capacitor 102, the feedback phase correction winding 90*b* inductively coupled to winding 90*a*, the tuned circuit comprising the capacitor 94 and tunable inductance 96, and the primary winding 98 of the feedback transformer 100**. The feedback transformer, as shown previously, is provided with eight secondary windings, each secondary winding being connected to a respective transistor for controlling the current flow therethrough.

In order to maintain the same current and power conditions in the right module, the oscillatory load circuit comprising the converter 92 and the inductance **90*a* is connected in series with the same number of turns, N2 plus N3 of the transformer 80', and in order to provide equal amounts of feedback power from both of the modules, a further separate winding having the turns N3 is provided on the transformer 80'**.

It will be apparent, as explained above, that the number of modules can be expanded to increase the power provided in the oscillatory circuit. In practice, four modules have been operated with no limitation as to the quantity usable being apparent. It will also be apparent to those skilled in the art that the basic switching circuit shown herein is not restricted to the bridge type configuration involving four switching transistors, but that the switching circuit may take the form of a half-bridge circuit, a push-pull circuit, or may be replaced by a single transistor or a silicon controlled rectifier switching means.

What is claimed is:

1. An electrical circuit for energizing an oscillatory load circuit providing sonic energy comprising:
- a source of direct current;
- a plurality of switching modules adapted to operate in parallel;
- a plurality of transformers, one associated with each of said modules, and each of said transformers having a primary winding and a secondary winding;
- each of said modules being connected to the primary winding of an associated transformer and to said source of direct current to cause, responsive to a control signal applied to a respective module, current of cyclically alternating polarity to flow from said source via said switching module through the primary winding of the associated transformer;
- the respective secondary windings of said transformers being coupled in series with each other to an oscillatory load circuit which includes a converter adapted to provide sonic energy responsive to alternating current electrical energy applied;
- feedback means comprising additional turns on each of said transformers coupled in series with one another to the primary winding of a feedback transformer having a plurality of secondary windings; and
- the secondary windings of said feedback transformer being coupled to said switching modules for providing said control signal, whereby to sustain the oscillations of said load circuit.

2. An electrical circuit as set forth in claim 1, each of said modules comprising two pairs of a first and a second serially connected transistor, said source of direct current being coupled across said pairs of serially connected transistors; the primary winding of an associated transformer being connected in series with a direct current blocking capacitor across the junction points between the serially connected respective first and second transistor of each pair; and an inductance coupled in series with said converter.

3. An electrical circuit as set forth in claim 2, said converter including a piezoelectric element, and being dimensioned to operate in the ultrasonic frequency range.

4. An electrical circuit for energizing an oscillatory load circuit providing sonic energy comprising:
- a source of direct current;

a pair of switching modules adapted to operated in parallel, each including two pairs of a first and a second serially connected transistor;

a pair of transformers, each having a primary winding of N1 turns, one of said transformers having two secondary windings of N2 and N3 turns respectively, and said other transformer having two respective secondary winding of $(N2+N3)$ turns and of N3 turns;

means connecting each of said primary windings in series with a direct current blocking capacitor across the junction points between the respective first and second serially connected transistors forming one of said modules, and for connecting said source of direct current across said modules;

an oscillatory load circuit, which includes an electroacoustic converter dimensioned to operate in the ultrasonic frequency range and having a piezoelectric means for converting electric energy applied to acoustic energy, coupled in series with an inductance serially to the series connection comprising said secondary transformer windings having N2 and N3 turns and said winding having $(N2+N3)$ turns;

a feedback transformer having a primary winding and eight secondary windings, each of said secondary windings being coupled respectively to one of said transistors for controlling current conduction through the associated transistor, and for causing said modules to operate in parallel;

means coupling the primary winding of said feedback transformer in series with a phase correction capacitor and a winding which is inductively coupled to said inductance of said load circuit, and in series with both said secondary windings of N3 turns each, whereby responsive to the feedback signal applied to said transistors the oscillations of said load circuit are sustained.

5. An electrical circuit as set forth in claim 4, and a tuned circuit comprising a capacitor and an inductance coupled in circuit with the primary winding of said feedback transformer.

References Cited

UNITED STATES PATENTS

| | | | |
|---|---|---|---|
| 3,002,142 | 9/1961 | Jensen | 331—56 |
| 3,026,484 | 3/1962 | Bennett et al. | 331—113 |
| 3,139,530 | 6/1964 | De Motte | 331—56 |
| 3,218,576 | 11/1965 | Winpisinger | 331—110 |
| 3,222,613 | 12/1965 | Geyger | 331—113 |

JOHN KOMINSKI, Primary Examiner

U.S. Cl. X.R.

321—2, 27; 331—113, 56